(12) United States Patent
DeMeuse

(10) Patent No.: US 6,514,625 B1
(45) Date of Patent: Feb. 4, 2003

(54) POLYOLEFIN FILMS BASED ON BLENDS OF POLYPROPYLENE AND OLEFIN HETEROPOLYMERS

(75) Inventor: Mark T. DeMeuse, Hockessin, DE (US)

(73) Assignee: Applied Extrusion Technologies, Inc., New Castle, DE (US)

( * ) Notice: Subject to any disclaimer, the term of this patent is extended or adjusted under 35 U.S.C. 154(b) by 245 days.

(21) Appl. No.: 09/723,375

(22) Filed: Nov. 28, 2000

Related U.S. Application Data

(63) Continuation-in-part of application No. 09/234,745, filed on Jan. 21, 1999, now abandoned.

(51) Int. Cl.$^7$ .............................................. B32B 27/32
(52) U.S. Cl. ...................... 428/516; 525/240; 428/220
(58) Field of Search ................................ 428/516, 220; 625/240

(56) References Cited

U.S. PATENT DOCUMENTS

| | | | |
|---|---|---|---|
| 5,322,726 A | 6/1994 | Dew | |
| 5,491,019 A | 2/1996 | Kuo | |
| 5,998,039 A | 12/1999 | Tanizaki et al. | |
| 6,086,967 A | 7/2000 | Whiteman | |
| 6,165,599 A * | 12/2000 | DeMeuse | 428/213 |
| 6,232,402 B1 * | 5/2001 | DeMeuse | 525/191 |
| 6,268,062 B1 * | 7/2001 | DeMeuse | 428/349 |
| 6,348,271 B1 | 2/2002 | Nakata et al. | |
| 6,410,136 B1 * | 6/2002 | DeMeuse | 428/347 |

FOREIGN PATENT DOCUMENTS

| | | |
|---|---|---|
| EP | 243965 | 11/1987 |
| EP | 763422 | 3/1997 |
| WO | WO 95/26269 | 10/1995 |
| WO | WO 98/20062 | 5/1998 |
| WO | WO 99/51665 | 10/1999 |

OTHER PUBLICATIONS

Database WPI, Section Ch, Week 199824, Derwent Publications Ltd., London GB, Class A17, AN 1998–266013, XP002119547 (1998).

Database WPI, Section Ch, Week 199804, Derwent Publications Ltd., London, GB, Class A17, AN 1998–036866, XP002119548 (1998).

Database WPI, Section Ch, Week 199527, Derwent Publications Ltd., London, GB, Class A17, AN 1998–20342, XP002119549 (1998).

Database WPI, Section Ch, Week 199935, Derwent Publications Ltd., London, GB, Class A17, AN 1999–412417, XP002119550 (1999).

Patent Abstracts of Japan, vol. 1997, No. 07, Jul. 31, 1997 an JP 09/084517A (Dainippon Printing Co. Ltd.), Mar. 31, 1997.

Handbook of Plastic Compounds, Elastomers and Resins compiled by Michael and Irene Ash, VCH, printed Apr. 4, 2000.

* cited by examiner

*Primary Examiner*—D. Lawrence Tarazano
(74) *Attorney, Agent, or Firm*—Caesar, Rivise, Bernstein, Cohen & Pokotilow, Ltd.

(57) ABSTRACT

Oriented polyolefin films are prepared with blends of a high crystalline polypropylene and an ethylene/propylene copolymer having less than 10%, by weight, of ethylene. These films, in a preferred embodiment, exhibit higher oxygen and moisture vapor transmission properties than do unmodified polypropylene. In addition, these films have low haze. This combination of properties make the films useful in modified atmosphere packaging applications for fresh produce and flowers.

24 Claims, No Drawings

POLYOLEFIN FILMS BASED ON BLENDS OF POLYPROPYLENE AND OLEFIN HETEROPOLYMERS

RELATED APPLICATION

This application is a continuation-in-part application of Ser. No. 09/234,745, filed on Jan. 21, 1999, entitled "Polyolefin Films Based on Blends of Polypropylene and Olefin Heteropolymer", now abandoned.

FIELD OF THE INVENTION

This invention relates to polyolefin films having certain unique properties. Specifically, it relates to clear polyolefin films that exhibit, inter alia, an increased oxygen transmission property as compared to conventional polypropylene films known to the art.

BACKGROUND INFORMATION

It is known that, for many applications, particularly packaging applications, polypropylene is less than totally satisfactory due to a relatively high permeability to oxygen. A great amount of effort has been expended in recent years to decrease the oxygen transmission characteristics of polypropylene. The best results to date have been obtained by metallization of the films.

There are, however, some applications in which a greater and controllable oxygen transmission rate is desired. This is particularly the case when fresh fruits, vegetables and flowers are to be packaged as these products continue to respire after they are packaged. Absence or insufficient levels of oxygen, which occurs as the oxygen originally present in the package is consumed, leads to premature senescence and spoilage of the products. At the same time, respiration leads to a build-up of moisture and carbon dioxide in the package, which can also lead to spoilage of the product if these materials cannot escape from the package.

For many fresh vegetables, fruits and flowers, conventional polypropylene films, whether monolayer or multilayer, of a thickness sufficient to be self-supporting, have oxygen and moisture vapor permeability values that are not sufficient to allow the optimum oxygen and moisture levels to be maintained in a sealed package. It is thus desirable to provide packaging films wherein the oxygen content can be replenished as necessary and from which moisture and carbon dioxide can escape.

It is known to prepare microporous films based on an opaque polymer mixture comprised of about 45% to 55% homopolypropylene and 55% to 45% of a copolymer of propylene and ethylene containing about 2% to 5% ethylene by weight, which films have greater oxygen permeability than films made of plain polypropylene. This polymer mixture is blended into a mixture comprised of about 40 to 60% of the polymer mixture and 60 to 40% of certain inorganic filler materials and is subjected to drawing to effect orientation. The filler material selected is one that causes voiding of the polymer matrix during the drawing operation. Exemplary of such voiding pigments are barium sulfate, calcium carbonate, silica, diatomaceous earth and titania. Calcium carbonate is said to be the preferred filler material. Anderson, U.S. Pat. No. 4,842,875, teaches the use of such films in the preparation of controlled atmosphere containers for use with fresh vegetables, fruits and flowers.

Microporous films known to the art as described above function reasonably well for preparing films having increased and, to a degree, controllable oxygen and moisture vapor permeability. However, the voiding pigments employed in the prior art are of a particle size large enough and are employed in concentrations great enough to result in formation of voids of such a size that the resultant films are almost totally opaque.

It is also known to prepare high OTR polyolefin films for some applications by laminating a polyethylene film of about one mil thickness to a polypropylene film of about 0.4 to 0.5 mil thickness. The polypropylene film acts as a stiffener to give the polyethylene sufficient stiffness that it can be used as a produce wrapper. The polyethylene, which has an inherently high or coextruding OTR, then acts as a high OTR sealant layer.

It is an object of this invention to provide transparent, high modulus polyolefin films based on polypropylene having, among other useful properties, increased oxygen and moisture vapor properties.

It is a further object of the invention to provide polyolefin films based on propylene that are useful in modified atmosphere packaging applications for packaging fresh vegetables, fruits and flowers.

It is yet another object of this invention to provide novel polyolefin films for use for packaging wherein a high modulus film is desired.

BRIEF DESCRIPTION OF THE INVENTION

In accordance with this invention, there are provided transparent, biaxially oriented polyolefin films based on blends of olefin heteropolymers and high modulus polypropylene, which films exhibit a stiffness (i.e tensile modulus) sufficient to have self-supporting, stand-alone characteristics such that they can be employed as packaging films. Specifically, the invention is a transparent, biaxially oriented film comprised of a polyolefin blend consisting essentially of about 25 to 90% by weight of a heteropolymer of at least two a-monoolefins and 75 to 10% by weight of a high modulus species of polypropylene. Most preferably the heteropolymer is an ethylene/propylene copolymer having less than 10% ethylene, by weight, and most preferably having about 4.5–6% ethylene, by weight. Films according to the invention can be prepared in a wide range of thicknesses from about 0.4 to about 1.5 mils.

In one preferred embodiment of the invention, the films have increased oxygen and moisture vapor permeability as compared with conventional, unmodified polypropylene films of similar thickness and are substantially clearer than are polypropylene films heretofore known to the art and possessing similar oxygen and moisture vapor transmission characteristics. In accordance with this embodiment of the invention, there are provided transparent oriented polyolefin films comprised of a polyolefin blend consisting essentially of about 25 to 90% by weight of a heteropolymer of at least two α-monoolefins; preferably an ethylene/propylene copolymer having less than 10% ethylene, by weight, and most preferably having about 4.5–6% ethylene, by weight, and 75 to 10% by weight of a high modulus species of polypropylene, said film being characterized by a thickness of about 40 to 80 gauge, preferably about 50 to 70 gauge, a tensile modulus of at least about 180,000 psi in both the machine direction and cross-machine direction, an oxygen transmission rate (OTR) of at least about 200 cc/100 sq. In/day/atmosphere and a moisture vapor transmission rate (MVTR) of at least about 0.5 gram/sq. In./day. Preferred films according to this embodiment of the invention are prepared with blends comprised of 40 to 90% heteropolymer and 60 to 10% high modulus polypropylene.

In other embodiments, the films have excellent properties for use in other packaging applications where a film of high modulus is desired.

DETAILED DESCRIPTION OF THE INVENTION

In the following discussion, gas permeability properties of the films of the invention will be discussed in terms of their OTR and MVTR. Carbon dioxide transmission rate is also an important parameter of these films affecting their utility as packaging materials for fresh produce items. Carbon dioxide transmission rates can be estimated using the generally accepted factor of a 4 to 1 weight ratio of carbon dioxide to oxygen transmitted per unit of time. When used in this disclosure, the term "α-monoolefin" (sometimes alpha-monoolefin) refers to a linear unsaturated hydrocarbon monomer having one carbon-carbon double bond, which double bond is located at the end of the linear chain. The term is intended to include any such monomer having 6 carbon atoms or less, including ethylene and propylene.

The term "heteropolymer" is intended to mean an olefin polymer containing at least two α-monoolefins. Typical of such heteropolymers are ethylene–propylene copolymers having about 4.5 to 6% by weight of ethylene, copolymers of ethylene containing about 5 to 25% by weight of other α-monoolefins of 4 to about 8 carbon atoms, butene-1-propylene copolymers containing about 5 to 34% by weight of butene-1 and ethylene-propylene-butene-1 terpolymers. Such heteropolymers can be converted to films and can be oriented within a temperature range comparable to the temperature range within which polypropylene is satisfactorily drawn to effect orientation.

The preferred heteropolymers are ethylene/propylene copolymers having less than 10%, by weight, ethylene and most preferably about 4.5–6% by weight ethylene. The use of such ethylene/propylene copolymers allows for the attainment of higher film OTR values than are possible with, for example, butene/propylene copolymers employing a percentage, by weight, of butene that is the same as the percentage, by weight, of ethylene employed in the ethylene/propylene copolymers. Thus, with the same amount of ethylene as butene in the copolymer, the OTR values are much higher in the films employing the ethylene/propylene copolymer. It is possible to achieve the same or similar OTR value by using either a butene/propylene copolymer or an ethylene/propylene copolymer; however, the percentage by weight of butene employed in the butene/propylene copolymer needs to be greater that the percentage by weight of ethylene employed in the ethylene/propylene copolymer. The use of a greater percentage of butene in the butene/propylene copolymer causes an undesired loss in the stiffness of the film.

The term "self supporting" in reference to a film means that the film can support itself without the aid of a supporting layer to provide the necessary strength and stiffness and it can readily be handled without being adhered to another substrate. Such a film may also be referred to as a "stand-alone" film.

The term "transparent", when employed in connection with the films of this invention, is intended to indicate a film having a haze value less than about 5% as measured with a conventional haze measuring instrument such as the BYK Gardner Haze-Gard Plus.)

Heteropolymers such as those described are well known in the polyolefin art and are widely used as heat seal layers on commercial polypropylene composite films. In those applications, the heteropolymers comprise very thin layers on the surface of a relatively thick polypropylene core. The layers thus employed are so thin that they cannot be wound into a roll, nor can they be used for any purpose that requires them to be handled except when they are adhered to a supporting substrate, i.e. they are not self supporting. As a general rule, when the heteropolymers are intended to serve as sealing layers, they are applied to the polypropylene core in layers of no more than about 0.1 mil in thickness, whereas the thicker polypropylene layer is usually about 0.70 to about 0.80 mil.

The heteropolymers are inherently more permeable to oxygen and moisture than is polypropylene per se. For example, a one mil layer of a typical biaxially oriented polypropylene exhibits OTR, measured according to ASTM D3985-81, on the order of about 125 to 150 cc/100 sq. in./atmosphere/day and MVTR on the order of about 0.3 to 0.4 g/100 sq.in./day. A one mil layer of a copolymer of propylene containing 6% ethylene exhibits OTR on the order of about 300 to 350 cc/100 sq. in./atmosphere/day and MVTR on the order of about 0.7 to 1.0 g/100 sq. in./day. However, when used as sealing layers, these latter materials are in such thin layers that they have virtually no effect on the OTR and MVTR of a film to which they may be applied since the lower OTR and MVTR of the polypropylene core does not permit all the oxygen and moisture that can pass through the sealant layer to pass through the polypropylene layer.

It has not heretofore been possible to take advantage of the greater permeability properties of the heteropolymers in packaging of fresh produce items since the heteropolymers have not heretofore been shown to be amenable to the production of packaging films. These materials lack the higher degree of stereoregularity characteristic of polypropylene and thus they do not possess sufficient tensile strength and stiffness to form stand-alone films of the thickness required for most packaging film applications.

In accordance with this invention, it has been found that a blend of the heteropolymer with a high modulus polypropylene within specific blending ratios and thickness limitations can be employed to prepare films that have a sufficient tensile modulus to be self-supporting while exhibiting the OTR and MVTR required for use in packaging fresh produce items that continue to respire after they are harvested and packaged for the market. It has been found that films having the desired properties can be prepared from polyolefin blends consisting essentially of about 30 to 90% by weight of the heteropolymer and 70 to 10% by weight of the high modulus polypropylene based on the total weight of the blend. A preferred blend composition is one consisting essentially of about 40 to 90% by weight of the heteropolymer and about 60 to 10% by weight of the high modulus polypropylene.

Films prepared with the blends just described, when cast and drawn to a typical packaging film thickness, i.e. 0.7 to 0.8 mil, exhibit several properties that make them unique and desirable for the packaging of fresh produce products. First, they are of a stiffness required of packaging materials generally, i.e. a tensile modulus of at least about 185,000 psi and significantly higher as the high modulus polypropylene content is increased. In addition, such films exhibit an OTR greater than 200 cc/100 sq. in./day/atmosphere; a level at which the packaged product can continue to respire for a reasonable time after it has been harvested, thus assuring a reasonable shelf life for the product. Thirdly, the films are found to have a moisture vapor transmission rate (MVTR) greater than that of conventional polypropylene films, whereby they permit the escape of moisture generated by the produce product's continued respiration after it is packaged. Finally, the films retain a high degree of clarity and transparency, so that the packaged product can be inspected for its appearance by the potential purchaser.

In order for the films to have a stiffness sufficient to permit their use as packaging films, a high modulus polypropylene or polypropylene composition is employed in the blends. Reference to "high modulus polypropylene" means a polypropylene or a polypropylene composition, which, when formed into a 70 gauge (0.7 mil thick) film drawn 7× by 7× on simultaneous draw equipment provides the film with a modulus value of at least about 450,000 psi in both the machine direction and cross-machine direction of the film. The most preferred high modulus polypropylene in this invention is a polypropylene homopolymer having a melt flow rate (MFR) in the range of about 2–4 dg/minute. Such a homopolymer is extremely well suited for the production of biaxially oriented film in accordance with this invention.

Suitable and preferred polypropylenes, which exhibit the required high modulus characteristics for use in the blends, include the newly developed high crystallinity polypropylene. This material, available under several trade names, is defined as having an isotactic index of at least 93%, i.e., the polymer contains no more than about 7%, and preferably no more than about 2 to 6% xylene soluble materials. Typical high crystallinity polypropylene is further characterized by higher stiffness, greater surface hardness, lower heat deflection at high temperatures, lower heat shrinkage and better creep properties than conventional isotactic polypropylenes, which have isotactic index generally less than 93%. Typical high crystallinity polypropylenes that can be employed include ACCPRO 9117, ACCPRO 9119 and ACCPRO 9218 (all available from Amoco Polymers, Alpharetta, Ga.), and also Chisso HF 5010 and Chisso XF 2805 (Chisso Chemical Co. Ltd., Tokyo, Japan and Aristech FF035C (Aristech Chemical Co. Pittsburgh, Pa.).

Reference to the specified isotactic index throughout this application refers to the value determined by NMR spectroscopy.

Another polypropylene composition having the high modulus required for use in the blends employed in this invention can be prepared by blending conventional commercial isotactic polypropylene prepared via Ziegler-Natta catalysis with a polypropylene prepared by use of a metallocene catalyst. Such blends and films prepared therewith are described in copending and commonly assigned U.S. patent application Ser. No. 09/055389, filed Apr. 6, 1998. In the referenced application, it is shown that very significant increases in tensile modulus are realized when these polymer types are blended. Such modulus improvements are realized with blends containing 10 to 90% of the Ziegler-Natta polymer.

Film forming and drawing to effect biaxial orientation can be carried out by conventional techniques, i.e. the well known tubular (bubble) process or the equally well known tenter process can be employed. When the films are prepared by the bubble process, the draw is effected simultaneously and uniformly in the machine and cross directions to about 3× to 7× and preferably about 5× to 7×. Using the tenter process, drawing is carried out sequentially to about 3× to 7× in the machine direction and to about 7× to 11× in the cross direction.

Films according to the invention that exhibit the high OTR and MVTR characteristic can be either monolayer or composite films wherein the heteropolymer/polypropylene blend is a core layer having a functional skin layer on either or both of its surfaces. Skin layers must have OTR and MVTR greater than that of the core. In either the monolayer or composite embodiment, the films are generally of a thickness from about 0.5 to 1.0 mil and preferably from about 0.5 to 0.8 mil.

Functional layers that can be employed as the skin layer include such layers as, e.g., a heat seal layer. Such a layer will be of a material of lower softening point than the core so that when heat is applied to effect the seal, the orientation of the core layer will not be disturbed. A commonly used heat seal layer is a terpolymer of propylene, ethylene and butene-1, unless, of course, that is the core heteropolymer. Other polymers that can be employed as a heat seal layer include polyvinyl or polyvinylidene chloride.

Another commonly used functional layer is a slip layer to facilitate handling of the film during later converting operations. Such a layer is comprised of a polymer containing a slip agent such as a high molecular weight fatty acid amide. A functional layer may also contain an antiblock additive to facilitate unwinding of the film after it has been wound at the terminus of the film manufacturing process. Preferably, such layers will be made of the same heteropolymer blend as is employed in the core layer. A slip layer can also be comprised of polypropylene since such a layer will be sufficiently thin as to be more oxygen permeable than the heteropolymer core.

The films according to the invention, in either the monolayer or the composite embodiment can also be provided with a cold seal coating. Such a coating is typically a rubber adhesive applied to the polymer surface.

The functional skin layer can also be a layer of polypropylene provided that the skin layer must be sufficiently thin that its OTR and its MVTR are greater than those of the heteropolymer core. A polypropylene skin layer can serve several functions when applied to one or both surfaces of the heteropolymer core. The use of polypropylene in slip and antiblock layers has already been mentioned.

Polypropylene skins can also be employed to provide printable surfaces to the films of the invention by subjecting the skins to an oxidative medium according to known methods. A preferred oxidative medium is corona discharge. Another preferred oxidative technique is flame treatment. Another, but less preferred technique is the use of an oxidizing acid. One skilled in the film art can readily determine the degree of oxidative treatment required for a particular application.

Another example of the use of polypropylene as a skin layer is in a case wherein the heteropolymer core is not sufficiently stiff or if its stiffness is marginal. The modulus of such a film can be increased into a more desirable range by application of a polypropylene skin. This layer can be of either a conventional polypropylene or of a high modulus polypropylene species so long as the modulus of the skin layer is greater than that of the heteropolymer core. The high modulus species is preferred for this purpose. The high modulus polypropylene species can be one of those cited hereinabove as being useful in the core blend. However, other high modulus species can also be employed in the skins.

One example of an alternative high modulus polypropylene species that can be employed is a blend of conventional Ziegler-Natta polypropylene with about 5 to 25% by weight of a low molecular weight hydrocarbon resin. The low molecular weight hydrocarbon resins are hydrogenated or unhydrogenated resins derived from olefin monomers, such as the resins derived from terpene monomers, coal tar fractions and petroleum feedstocks. In general, the low molecular weight resins are characterized by a molecular weight less than about 5000, a $T_g$ of about 50 to 100° C. and a softening point less than about 140° C. Suitable resins include those prepared from terpene monomers (e.g., limonene, alpha and beta pinene, such as Piccolyte resins from Hercules Incorporated, Wilmington, Del., and Zonatac resins from Arizona Chemical Company, Panama City, Fla.). Other low molecular weight resins are prepared from hydrocarbon monomers and mixtures thereof, such as $C_5$ monomers (e.g., piperylene, cyclopentene, cyclopentadiene, and isoprene), oligomerized $C_5$ monomers, particularly the thermally oligomerized $C_5$ monomers such as the hydrogenated thermally oligomerized cyclopentadiene resins sold under the trade name Escorez (for example Escorez 5300) by Exxon Chemical Co. of Baytown, Tex. Others are prepared from $C_9$ monomers, particularly the monomers derived from $C_9$ petroleum fractions which are mixtures of aromatics, including styrene, methyl styrene, alpha methyl styrene, vinyl naphthalene, the indenes and methyl indenes and, additionally, pure aromatic monomers, including styrene, α-methyl-styrene and vinyltoluene. Examples of these resins include hydrogenated α-methyl styrene--vinyl toluene resins sold under the trade name Regalrez by Hercules Incorporated of Wilmington, Del. The hydrogenated $C_9$ and pure monomer resins are preferred. Particularly preferred are the hydrogenated cyclopentadiene resins and the hydrogenated aromatic resins derived from pure aromatic monomers, e.g., the hydrogenated α-methyl styrene--vinyltoluene copolymers.

Another species of high modulus polypropylene that can be employed in the skin is nucleated polypropylene. These are conventional polypropylenes that have been nucleated to increase their crystallinity level and which exhibit higher modulus as a result. An example of a nucleated polypropylene is Aristech FF035C (Aristech Chemical Co., Pittsburgh, Pa.).

In addition to an increase in the modulus of the film structure to which reference is made above, it is found that a polypropylene skin can be employed to control the OTR and MVTR of the composite film.

As stated above, a film of a heteropolymer inherently has a greater OTR than does a film of a propylene film when films of a similar thickness are compared. This is also true of the films of the blends according to this invention. It is known that the OTR of a polyolefin film is dependent on its thickness and increases in almost a straight line relationship to thickness as thickness is decreased. Accordingly, a polypropylene skin layer has an OTR substantially greater than that of the polypropylene/heteropolymer blend core layer employed in the films of this invention.

Even though The OTR of the skin layer of polypropylene is greater than that of the core, it does have an effect on the OTR (and the MVTR) of the composite structure. The OTR of the composite structure is less than that of the core layer alone. This not the case with the composite films heretofore known wherein the heteropolymer is employed as a thin heat sealable skin layer on a polypropylene core. In those films, the differential between the OTR of the skins and that of the core is so great that the time required for the oxygen to pass through the skin is negligible.

With the films of this invention, the differential between the OTR of the skins and that of the core is not nearly so great and the time required for the oxygen to pass through the skins becomes a factor with respect to the overall OTR of the composite. The OTR of the composite film can be calculated based on a knowledge of the OTR of the components as set forth in the following discussion.

Since OTR is a rate, it can be represented by distance (i.e., film thickness) divided by time required for oxygen to pass through the film, i.e $$OTR = \frac{thickness}{time}$$

Accordingly, the time required is equal to the thickness divided by the OTR, i.e.

$$Time = \frac{thickness}{OTR}$$

For a three layer film, the composite OTR is the composite film thickness divided by the sum of the times required for oxygen to pass through the individual layers, i.e.

$$compositeOTR = \frac{thickness}{\frac{T_1}{OTR_1} + \frac{T_2}{OTR_2} + \frac{T_3}{OTR_3}}$$

where $T_1$ and $T_3$ represent the thicknesses of the skin layers and $T_2$ represents the thickness of the core layer of the composite while $OTR_1$ and $OTR_3$ represent the OTR values of the corresponding skin layers and $OTR_2$ represents the OTR value of the core layer. Since the OTR and the thickness of the individual layers can be easily measured, it is not necessary to know the absolute time required for the oxygen to pass through each layer.

As stated hereinabove, it is known that the OTR of a polyolefin film increases as an almost linear function of the film's thickness. With this knowledge, and knowing the thickness of a film of any thickness, it is possible, using the above calculation, to tailor films to have a predetermined OTR for packaging specific items of produce. If one has sufficient information concerning the respiration rate of a product, one can vary the layer thicknesses to approximate that respiration rate sufficiently accurately for successful commercial use.

Composite films can be prepared by coextrusion, lamination or extrusion coating. All of these techniques are well known in the film art.

Preparing Blends of Heteropolymer and Polypropylene

Pellets of the desired polypropylene and heteropolymer in the desired ratios were dry mixed and melt blended in a Leistritz twin screw extruder (American Leistritz Extruder Corporation, Somerville, N.J.). The blended polymer mass was extruded into a water bath at room temperature to quench it and the quenched strands were chopped into pellets.

EXAMPLE 1

A series of blends of a high modulus polypropylene (Aristech FF035C) and a copolymer of ethylene and propylene containing about 4.5% by weight ethylene (Fina 8573, Fina Chemical Co. Housten, Tex.) were prepared and pelletized as described in the previous paragraph. All were extruded at 170 RPM and at a temperature between 242 and 244° C.

The blend compositions thus prepared were cast at a temperature of about 246° C. onto a casting roll maintained at about 60° C. Extrusion was carried out at about 3.1 to 3.4 fpm. A cast film of about 23 mil thickness was recovered.

The cast film, in each case was drawn about 6× by 6× on a T. M. Long Stretcher (T. M. Long Corporation, Somerville, N.J.) and heat set 10%. Film orientation conditions are recorded in Table A.

TABLE A

| Wt % heterop. | Temperature | Preheat |
|---|---|---|
| 0 | 145° C. | 35 sec. |
| 10 | 145° C. | 35 sec. |
| 25 | 145° C. | 35 sec. |
| 50 | 145° C. | 35 sec. |
| 75 | 135° C. | 25 sec. |
| 90 | 130° C. | 25 sec. |
| 100 | 125° C. | 25 sec. |

The film thus prepared were characterized as to their modulus, measured on an Instron tensile tester, their OTR according to ASTM D-3985-81 and their haze value measured according to ASTM D-1003, using a Gardner Haze Meter.

The results of this testing are set forth in Table 1, below.

TABLE 1

| Wt % heterop. | Film Gauge | Modulus | % Haze | OTR* |
|---|---|---|---|---|
| 0 | 71 | 481,400 psi | 0.59 | 132 |
| 10 | 69 | 435,837 psi | 0.57 | 160.6 |
| 25 | 69 | 396,228 psi | 0.49 | 171.7 |
| 50 | 76 | 306,578 psi | 0.60 | 211.2 |
| 75 | 70 | 241,711 psi | 0.37 | 271.0 |
| 90 | 70 | 202,825 psi | 0.32 | 309.9 |
| 100 | 67 | 173,905 psi | 0.28 | 358.7 |

*Unit is cc/100 sq.in/atmosphere/day

It is readily seen from the data recorded in Table 1 that as the heteropolymer concentration is increased in the range of about 50 to 90%, the OTR increases to a point at which the film becomes satisfactory for use in modified atmosphere packaging applications and its modulus remains within a useable range.

EXAMPLE 2

Following the same procedures as were followed in Example 1, a series of films were prepared using a blend of the same high modulus polypropylene and an ethylene--propylene copolymer containing about 6% ethylene by weight (Fina Z9470). Orientation conditions for these films are in Table B, below.

TABLE B

| Wt % Heterop. | Temperature | Preheat |
|---|---|---|
| 0 | 150° C. | 35 sec. |
| 10 | 150° C. | 35 sec. |
| 25 | 150° C. | 35 sec. |
| 50 | 150° C. | 35 sec. |
| 75 | 145° C. | 30 sec. |
| 90 | 130° C. | 20 sec. |
| 100 | 120° C. | 20 sec. |

The properties of the films thus prepared are set forth in Table 2, below.

TABLE 2

| Wt % heterop. | Film Gauge | Modulus | % Haze | OTR* | MVTR* |
|---|---|---|---|---|---|
| 0 | 57 | 487,805 psi | 0.67 | 179.6 | 0.401 |
| 10 | 60 | 462,067 psi | 0.64 | 189.2 | 0.569 |
| 25 | 59 | 363,416 psi | 0.79 | 215.6 | 0.696 |
| 50 | 69 | 264,570 psi | 1.36 | 276.9 | 0.618 |
| 75 | 66 | 180,002 psi | 1.27 | 364.4 | 0.813 |
| 90 | 60 | 136,300 psi | 0.64 | 466.5 | 1.372 |
| 100 | 59 | 120,602 psi | 0.75 | 473.7 | 1.561 |

*Unit is cc/100 sq. In./atmosphere/day
**Unit is gms/100 sq. In./day

Here again, it is readily seen that a heteropolymer content from provides a film having a satisfactory modulus and both OTR and MVTR suitable about 25 to 75% for use in modified atmosphere packaging.

EXAMPLE 3

Another series of film were prepared as described in Example 1 employing, as the high modulus polypropylene species, Accpro 9117 from Amoco Polymers and the 6% ethylene copolymer employed in Example 2.

The polymer and the heteropolymer were pelletized as previously described, using substantially the same processing conditions. The blend compositions were cast at about 3.1 to 3.2 fpm and a temperature of about 245° C. onto a casting roll maintained at about 60° C. A cast film of about 23 mil thickness was recovered. The cast film, in each case, was drawn about 6× by 6× on the T. M. Long stretcher. Film orientation conditions are recorded in Table C.

TABLE C

| Wt % Heterop. | Temperature | Preheat |
|---|---|---|
| 0 | 150° C. | 40 sec. |
| 25 | 150° C. | 30 sec. |
| 50 | 150° C. | 25 sec. |
| 75 | 140° C. | 20 sec. |
| 100 | 125° C. | 20 sec. |

The resulting films were characterized as to their modulus, their OTR and their Haze value with the results recorded in Table 3 below.

TABLE 3

| Wt % Heterop. | Film gauge | Modulus | % Haze | OTR |
|---|---|---|---|---|
| 0 | 58 | 517,637 | 0.55 | 179.9 |
| 25 | 70 | 362,435 | 0.48 | 205.7 |
| 50 | 64 | 286,409 | 0.66 | 297.6 |
| 75 | 61 | 184,078 | 0.77 | 442.4 |
| 100 | 51 | 102,424 | 2.94 | 679.0 |

Here again, it is readily seen that a heteropolymer content in the blends from about 25 to 75% provides a film suitable for use in modified atmosphere packaging.

EXAMPLE 4

In this example, two composite film structures were prepared consisting, in one case, (sample 4a), of a core layer comprised of a 50/50 blend of a high modulus polypropylene (Aristech FF035C) and a 4.5% ethylene copolymer with propylene (Fina 8573). having a skin layer of the same polypropylene on both of its surfaces. In the other case (Sample 4b), the skin layers were the same polypropylene on one surface and the 4.5% ethylene copolymer on the other surface. A control (Sample 4a), was also prepared having no surface layers.

These films were all cast onto a 103° C. casting roll at about 3.1 fpm, then drawn 6× by 6× at about 130° C.

Property data for these films are recorded in Table 4, below.

TABLE 4

| Sample No. | Gauge | Modulus | % Haze | OTR |
|---|---|---|---|---|
| 4a | 66 | 363,856 | 0.47 | 176.1 |
| 4b | 60 | 298,909 | 2.08 | 235.1 |
| 4c | 64 | 302,801 | 0.54 | 236.8 |

It is readily seen from Example 4 that the addition of a polypropylene skin or skins is an effective way to decrease or otherwise control the oxygen permeability of the film. Sample No. 4a provides the maximum reduction of the OTR for a case in which the product requires a lower oxygen permeability than that afforded by the polypropylene/ heteropolymer blend, but greater than that of polypropylene alone. In the case of Sample 4b, the OTR value is little changed from that of the polypropylene/heteropolymer blend, but this embodiment has the advantage of being readily heat sealable.

EXAMPLE 5

Example 4 was repeated except that the heteropolymer employed as the core layer was a 6% ethylene copolymer with propylene (Fina Z9470). In this example, the films were cast at 3.3 fpm on a casting roll maintained at 99° C. Films were drawn 6× by 6×. Properties measured for these films are recorded in Table 5.

TABLE 5

| Sample No. | Gauge | Modulus | % Haze | OTR |
|---|---|---|---|---|
| 5a | 65 | 372,455 | 0.71 | 187.5 |
| 5b | 74 | 281,200 | 0.82 | 217.0 |
| 5c | 75 | 303,650 | 1.78 | 207.7 |

Here again, the control over the OTR of a film that results from the presence of a polypropylene skin or skins is readily seen The following examples demonstrate the preparation of thicker composite films according to the invention. These films, due to their thickness, exhibit lower OTR values than do those of Examples 1 through 5. This makes them less suitable for modified atmosphere packaging, but they are suitable for other polypropylene packaging film applications where higher OTR is not necessary or desired.

EXAMPLE 6

A three layer composite film was cast on a pilot scale tenter film line fitted with a three layer composite die. This 45 mil cast film consisted of a core layer comprised of a 25/75 blend of nucleated high modulus polypropylene (Aristech FF035C from Aristech Chemical Co. Pittsburgh, Pa.) and an ethylene--propylene copolymer containing about 4.5% ethylene. On one of its surfaces it carried a skin layer of the same ethylene--propylene copolymer containing 0.1% of a high molecular weight aliphatic acid amide slip agent (Crodamide BR from Croda, Inc). On the other surface, it carried a skin layer of the same ethylene--propylene copolymer containing 0.2% of a cross-linked polydimethylsiloxane antiblocking agent (Tospearl T-120 from Sumitomo Chemical Corp.). This layer can also serve as a heat seal layer.

The three layer cast film was drawn 6× in the machine direction at 110° C. and 8.6× in the transverse direction at 152° C. using tenter equipment. A film of 100 gauge (1 mil) thickness was recovered. This film consisted of a 96 gauge core with a 2 gauge skin on each of its surfaces.

Physical properties were measured for this film with the results recorded in Table 6, below. In addition to the measurements recorded in Table 4, this film was also tested for its heat sealability. The sealability was found to meet commercial requirements.

EXAMPLE 7

A second, thicker, composite film was prepared using the same polymers and copolymers as were used in Example 6. This cast film was drawn 6× in the machine direction at 110° C. and 9.5× at 151° C. in the transverse direction. The core layer of the drawn film was 116 gauge and the skins were each 2 gauge.

Physical properties measured for this film are recorded in Table 6, below.

EXAMPLE 8

Another 3 layer film was prepared in the same manner as the film prepared in Example 6. This film consisted of a core layer comprising a 50/50 blend of high modulus polypropylene (Aristech FF 035C) and a copolymer of ethylene and propylene containing 6% ethylene by weight. The cast film was drawn 6× in the machine direction at 110° C. and 9.4× in the transverse direction at 153° C. The core layer of the drawn film was 96 gauge and the skin layers were each 2 gauge.

Physical properties of this film are recorded in Table 6, below.

EXAMPLE 9

Another 3 layer film was prepared in the same manner as the film prepared in Example 6. This film was identical to that of Example 6 except that the core layer contained as the high modulus component Accpro 9117 (Amoco Polymers, Alpharetta, Ga.) The cast film was drawn 6× in the machine direction at 110° C. and 10.2× in the transverse direction at 151° C. The core layer of the drawn film was 96 gauge and the skin layers were each 2 gauge.

Physical properties measured for this film are recorded in Table 6, below.

TABLE 6

| Example no. | TD Modulus | MD Modulus | OTR | % Haze |
|---|---|---|---|---|
| 6 | 323,961 | 196,403 | 133 | 2.8 |
| 7 | 332,352 | 207,604 | 150 | 2.3 |
| 8 | 433,468 | 224,767 | 149.5 | 4.6 |
| 9 | 476,704 | 251,590 | 126.2 | 0.96 |

The film of Example 6 has OTR suitable for use in many modified atmosphere packaging applications. The films of Examples 7, 8 and 9 would have very limited use in modified atmosphere packaging. This is due to their greater than normal thickness, which causes their OTR to be too low for this application. However, each of these films can be used in any other application where a polyolefin film of greater than normal thickness is desired.

What is claimed is:

1. A transparent biaxially oriented polyolefin film comprised of a polyolefin blend consisting essentially of about 25 to 90% by weight of an ethylene/propylene copolymer including less than 10%, by weight, ethylene, and 75 to 10% by weight of a high modulus polypropylene.

2. The film according to claim 1, wherein the ethylene/propylene copolymer includes about 4.5–6%, by weight, ethylene.

3. The film according to claim 1, wherein the high modulus polypropylene is a polypropylene homopolymer having a melt flow rate in the range of about 2–4 dg/minute.

4. The film according to claim 2, wherein the high modulus polypropylene is a polypropylene homopolymer having a melt flow rate in the range of about 2–4 dg/minute.

5. A transparent biaxially oriented polyolefin film comprised of a polyolefin blend consisting essentially of about 25 to 90% by weight of an ethylene/propylene copolymer including less than 10%, by weight, ethylene and 75 to 10% by weight of a high modulus polypropylene, said film being characterized by a thickness of about 40 to 80 gauge, a tensile modulus of at least about 180,000 psi in both the machine direction and cross-machine direction, an oxygen transmission rate (OTR) of at least about 200 cc/100 sq. In/day/atmosphere and a moisture vapor transmission rate (MVTR) of at least about 0.5 gram/sq. in./day.

6. The film according to claim 5 wherein the polyolefin blend is comprised of about 40 to 90% by weight of the ethylene/propylene copolymer and 60 to 10% by weight of the high modulus polypropylene.

7. The film according to claim 5, wherein the ethylene/propylene copolymer includes about 4.5–6%, by weight, ethylene.

8. The film according to claim 6, wherein the ethylene/propylene copolymer includes about 4.5–6%, by weight, ethylene.

9. The film according to claim 5, wherein the high modulus polypropylene is a polypropylene homopolymer having a melt flow rate in the range of about 2–4 dg/minute.

10. The film according to claim 6, wherein the high modulus polypropylene is a polypropylene homopolymer having a melt flow rate in the range of about 2–4 dg/minute.

11. The film according to claim 5, wherein the high modulus polypropylene is a polypropylene homopolymer having a melt flow rate in the range of about 2–4 dg/minute.

12. The film according to claim 6, wherein the high modulus polypropylene is a polypropylene homopolymer having a melt flow rate in the range of about 2–4 dg/minute.

13. The film according to claim 7, wherein the high modulus polypropylene is a polypropylene homopolymer having a melt flow rate in the range of about 2–4 dg/minute.

14. The film according to claim 8, wherein the high modulus polypropylene is a polypropylene homopolymer having a melt flow rate in the range of about 2–4 dg/minute.

15. The transparent biaxially oriented composite polyolefin film comprised of a core layer carrying a functional skin layer on one or both of its surfaces, said core layer being comprised of a polyolefin blend consisting essentially of about 25 to 90% by weight of an ethylene/propylene copolymer including less than 10%, by weight, ethylene and 75 to 10% by weight of a high modulus polypropylene.

16. The film according to claim 15, wherein the ethylene/propylene copolymer includes about 4.5–6%, by weight, ethylene.

17. The film according to claim 15, wherein the high modulus polypropylene is a polypropylene homopolymer having a melt flow rate in the range of about 2–4 dg/minute.

18. The film according to claim 16, wherein the high modulus polypropylene is a polypropylene homopolymer having a melt flow rate in the range of about 2–4 dg/minute.

19. The film according to claim 15 characterized by a thickness of about 40 to 80 gauge, a tensile modulus of at least about 180,000 psi in both the machine direction and the cross-machine direction, an oxygen transmission rate (OTR) of at least about 200 cc/100 sq. In/day/atmosphere and a moisture vapor transmission rate (MVTR) of at least about 0.5 gram/sq. in./day.

20. The film according to claim 16 characterized by a thickness of about 40 to 80 gauge, a tensile modulus of at least about 180,000 psi in both the machine direction and the cross-machine direction, an oxygen transmission rate (OTR) of at least about 200 cc/100 sq. In/day/atmosphere and a moisture vapor transmission rate (MVTR) of at least about 0.5 gram/sq. in./day.

21. The film according to claim 15 wherein the functional layer on at least one of its surfaces is a layer of a high modulus polypropylene.

22. The film according to claim 16 wherein the functional layer on at least one of its surfaces is a layer of a high modulus polypropylene.

23. The film according to claim 18 wherein the functional layer on at least one of its surfaces is a layer of a high modulus polypropylene.

24. The film according to claim 19 wherein the functional layer on at least one of its surfaces is a layer of a high modulus polypropylene.

* * * * *